United States Patent
Döhring et al.

(10) Patent No.: US 6,343,983 B1
(45) Date of Patent: Feb. 5, 2002

(54) VENTILATION BOX FOR ARRANGEMENT IN A MOTOR VEHICLE

(75) Inventors: Klaus Döhring, Aschaffenburg; Klaus-Jürgen Kurr, Schaafheim; Rolf Wich, Hainsburg, all of (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/508,280
(22) PCT Filed: Sep. 7, 1998
(86) PCT No.: PCT/EP98/05663
§ 371 Date: May 30, 2000
§ 102(e) Date: May 30, 2000
(87) PCT Pub. No.: WO99/12756
PCT Pub. Date: Mar. 18, 1999

(30) Foreign Application Priority Data

Sep. 9, 1997 (DE) .......................................... 197 40 402

(51) Int. Cl.⁷ ................................................ B60H 1/00
(52) U.S. Cl. ........................ 454/121; 454/127; 454/143
(58) Field of Search ................ 454/121, 127, 454/143, 156, 159, 161

(56) References Cited

U.S. PATENT DOCUMENTS

| | | | |
|---|---|---|---|
| 3,313,915 A | * 4/1967 | Chamberlain, Jr. | 454/127 |
| 5,111,738 A | 5/1992 | Becquerel | |
| 5,364,159 A | * 11/1994 | Kelman et al. | 454/143 |

FOREIGN PATENT DOCUMENTS

| | | |
|---|---|---|
| DE | 4236674 | 5/1994 |
| DE | 4407424 | 10/1994 |
| DE | 19534738 | 3/1996 |
| EP | 0799734 | 10/1997 |
| EP | 0816145 | 1/1998 |
| FR | 2623776 | 6/1989 |

OTHER PUBLICATIONS

Patent Abstracts & JP 59 171712 A (Mitsubishi Denki KK) Sep. 28, 1984.

* cited by examiner

Primary Examiner—Jiping Lu
(74) Attorney, Agent, or Firm—Martin A. Farber

(57) ABSTRACT

In a ventilation box (2) of a motor vehicle, the ventilation box being composed of a plurality of housing parts (5–7), housing parts (6, 7) arranged in the region of a steering column (3) are formed to be fastened selectively on the left or the right side of the motor vehicle. As a result, the ventilation box (2) can be converted for the respective motor vehicle, irrespective of the position of the steering column (3).

30 Claims, 3 Drawing Sheets

VENTILATION BOX FOR ARRANGEMENT IN A MOTOR VEHICLE

FIELD AND BACKGROUND OF THE INVENTION

The invention relates to a ventilation box intended to be arranged in a motor vehicle and having a plurality of housing parts for the guidance of fresh air out of the surroundings or of surrounding air into the passenger compartment.

In present-day motor vehicles having a plurality of intake and blow-out orifices arranged at various points, such ventilation boxes are often fastened to the end face of the passenger compartment and are known in practice in a variety of designs. Various ventilation flaps, often a blower and also a heating or cooling device are arranged within the ventilation box. As a result, the ventilation box is a very bulky and large-volume component and is mounted next to or below adjacent components, such as, for example, the instrument panel and steering column of the motor vehicle. Since the shape and position of the adjacent components in the motor vehicle are usually predetermined, the housing parts of the ventilation box are adapted to the adjacent components.

This is a disadvantage particularly for motor vehicles which are intended for a selective arrangement of the steering column on the right or the left side of the vehicle. It is therefore necessary to provide differently designed ventilation boxes according to the invention depending on the arrangement of the steering column. Alternatively, the ventilation box could be arranged exclusively in the middle of the vehicle. However, this is possible only where ventilation boxes with very small dimensions are concerned.

SUMMARY OF THE INVENTION

The problem on which the invention is based is to provide a ventilation box of the type initially mentioned, in such a way that it is suitable equally for use vehicles with the steering column on the left or the right side of the vehicle and can still be designed with a large volume.

This problem is solved, according to the invention, in that a first housing part is provided to be fastened approximately in the middle of the vehicle, and in that the housing parts arranged opposite a steering column of the motor vehicle with respect to the vehicle longitudinal axis are provided to be fastened selectively to that side of the first housing part which is on the left or on the right in the direction of travel.

By virtue of this configuration, housing parts of the ventilation box according to the invention which project into the region of the steering column can be arranged simply on the side located opposite the steering column of the motor vehicle. Only a single ventilation box according to the invention is therefore required for a motor vehicle which is intended for the selective arrangement of the steering column on the left or the right side of the vehicle. Moreover, because of the invention, a particularly small number of compression or injection molds are required in order to manufacture the housing parts for differently designed ventilation boxes. This is advantageous, in particular, when the ventilation box according to the invention is manufactured in series, since the costs of stock keeping and of replacement parts are markedly reduced as a result.

The problem initially mentioned is also solved, according to the invention, in that a first housing part is designed to be fastened approximately in the middle of the vehicle, and in that a second housing part capable of being installed in front of the first housing part in the direction of travel, together with further housing parts arranged opposite a steering column of the motor vehicle with respect to the vehicle longitudinal axis, is designed to be fastened selectively to the first housing part in two positions, the two positions being rotated through approximately 180° relative to one another about the vehicle longitudinal axis.

The configuration of a ventilation box according to the invention can consequently be simplified even further and the number of variants of its individual components further reduced. Manufacturing and logistics costs are thereby additionally lowered. In particular, it is also advantageous that, in this ventilation box, the parting plane, and therefore also the connecting elements, such as, for example, a connecting flange, between the rotatable housing parts can be designed with a particularly large area, thus achieving high mechanical stability and a large flow cross section of the ventilation box.

The known ventilation boxes often have vertically oriented intake orifices to be arranged, for example, in a foot space of the passenger compartment or in a recess of an end wall of the motor vehicle. It would be conceivable to arrange the intake orifices on the front and rear side of the ventilation box and to close intake orifices not required by means of dummy plug. The ventilation box becomes highly cost-intensive due to the manufacture and mounting of the dummy plugs. According to an advantageous development of the invention, the ventilation box consists of very few components if a housing part having intake orifices is formed on adjacent housing parts for selective fastening to the intake orifices in a front or rear region.

The ventilation box according to the invention has a particularly simple form if the housing parts intended for selective arrangement and the other housing parts each have a flange for their connection.

According to another advantageous development of the invention, the connection of two housing parts can be sealed off at particularly low outlay if the housing parts intended for selective arrangement have continuous edges provided for engaging over adjacent regions of the other housing parts. By virtue of this configuration, the continuous edges engage over the connecting points of the housing parts, so that it is no longer necessary for the flanges to be braced in order to bring about intended leak tightness.

According to another advantageous development of the invention, the dimensions of the flanges and/or of the continuous edges are particularly small if the flanges and/or the continuous edges are arranged in each case approximately perpendicularly to the direction of flow. Due to the small dimensions of the flanges, it becomes particularly simple and cost-effective to seal them off, and only a little installation space is required.

Intake orifices for fresh air are arranged, as a rule, on a connection piece led through the end wall of the motor vehicle. According to another advantageous development of the invention, the connection piece can be led through the end wall on both sides of the vehicle if the flanges and/or the continuous edges are arranged approximately vertically with respect to the vehicle floor.

According to another advantageous development of the invention, the housing parts intended to be arranged selectively on the left or the right side of the vehicle can be arranged in a very simple way in the motor vehicle region facing away from the steering column if the housing parts intended for selective arrangement are rotatable relative to the other housing parts.

Preferably, one of the selectively fastenable housing parts is part of a fresh-air/surrounding-air flap. It is also beneficial if one of the selectively fastenable housing parts is part of a blower box. According to these developments of the invention, for simplification only a single model of particularly large-volume components of the ventilation box has to be kept in stock.

It is also particularly advantageous, in this respect, if one of the selectively fastenable housing parts is part of a diffuser which conventionally has a large area and therefore likewise occupies considerable storage and transport capacities.

According to an advantageous development of the invention, a particularly compact arrangement of the ventilation box is achieved in that the blower box has a blower wheel and a blower motor. Preferably, the blower motor is arranged on the topside or underside of the blower box with respect to the vehicle floor, so that, on the one hand, the motor is accessible for maintenance work and a large flow cross section is kept free within the blower box and, on the other hand, due to the approximately vertical arrangement, the passenger space, in particular the front-seat passenger's foot space, is not restricted by the blower motor.

According to an advantageous development of the invention, the blower motor is connected releasably to the blower box, thus making it possible, in the event of damage, easily to exchange the motor and, if appropriate, the blower wheel if the latter is connected to the motor shaft so as to form a single component.

It is particularly advantageous if the blower box has, on its topside and underside with respect to the vehicle floor, junction elements for the blower motor which in each case correspond to one another. In this way, irrespective of whether the blower box is installed in a non rotated position or in a position rotated through about 180° into the ventilation box, the motor can always be mounted on the topside (that is to say, standing) or on the underside (that is to say, suspended) of the blower box. Suspended installation is preferred, making it possible, in the event of repair, to have particularly simple access to the blower motor via the passenger space, in particular the front-seat passenger foot space. The junction elements not required in each case are provided with a dummy plug.

It would be conceivable to flange the blower motor on to the blower box. However, mounting or demounting of the motor can be carried out in a particularly simple way and without an additional tool when, according to an advantageous development of the invention, the connection of the blower motor and blower box is a bayonet fastening.

BRIEF DESCRIPTION OF THE DRAWINGS

The invention permits numerous embodiments. In order to make its basic principle even clearer, two of these are illustrated in the figures of the drawings and are described below. In the drawings.

DETAILED DESCRIPTION OF THE PREFERRED EMBODIMENT

Figure 1:
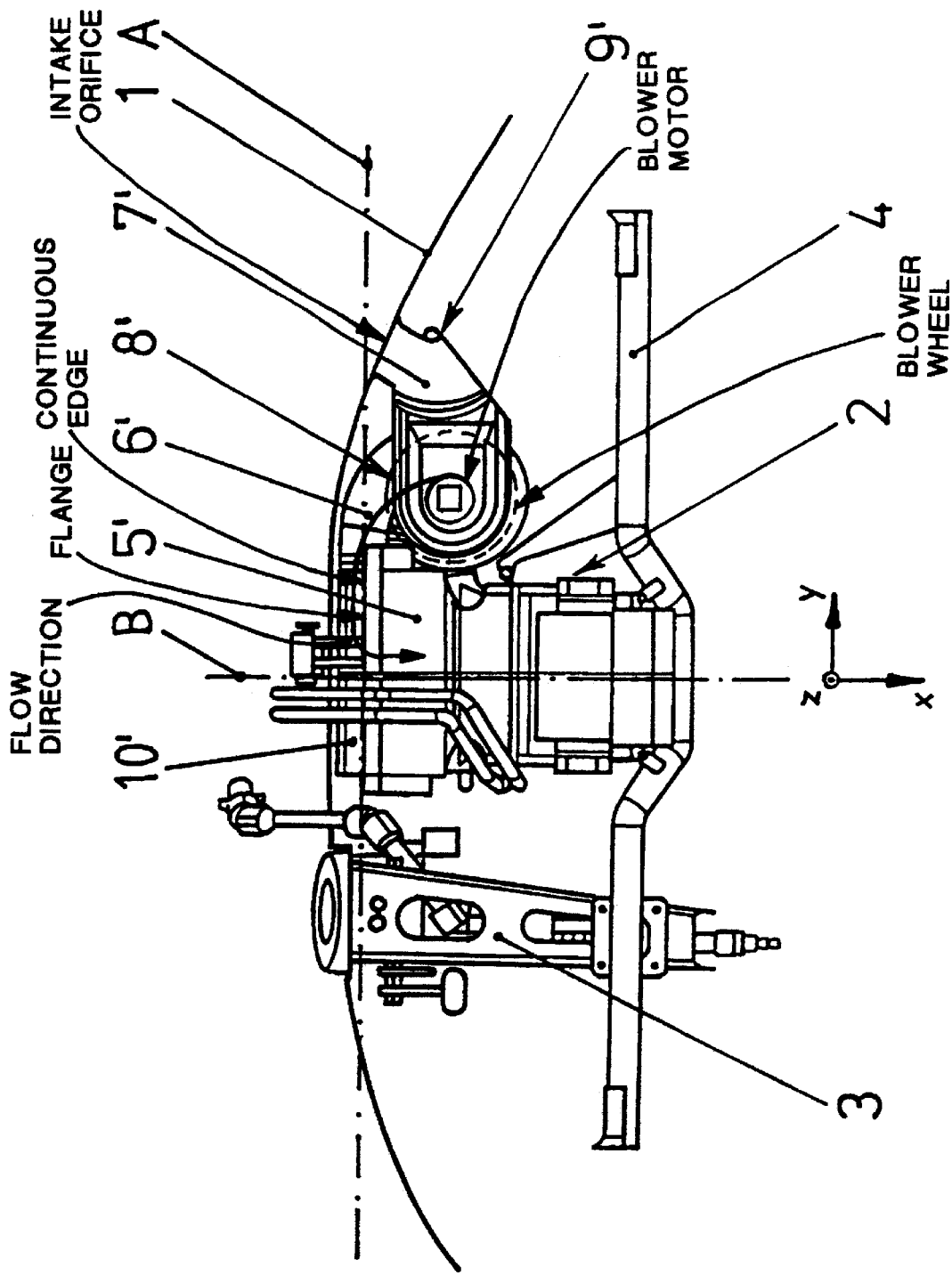
FIG. 1 shows a ventilation box according to the invention for a motor vehicle with a steering column arranged on the left side of the vehicle.

FIG. 1 shows a top view of a ventilation box 2 arranged in front of a diagrammatically illustrated end wall 1. A motor vehicle coordinate system xyz indicates the direction of the vehicle longitudinal axis (x-axis), vehicle transverse axis (y-axis) and vehicle vertical axis (z-axis). The vehicle longitudinal axis is additionally depicted as a dashed and dotted line B in FIG. 1.

A steering column 3 is arranged on the left side next to the ventilation box 2. The ventilation box 2 and the steering column 3 are fastened to a crossmember 4. The ventilation box 2 is composed of a plurality of housing parts 5', 6', 7' and 10'. Both the largest housing part 5' of the ventilation box 2 and a diffuser 10' are arranged in a front middle region of the motor vehicle. On the right side of the vehicle, the ventilation box 2 has housing parts 6', 7' of a blower box 8' and of a fresh-air/surrounding-air flap 9'.

Figure 2:
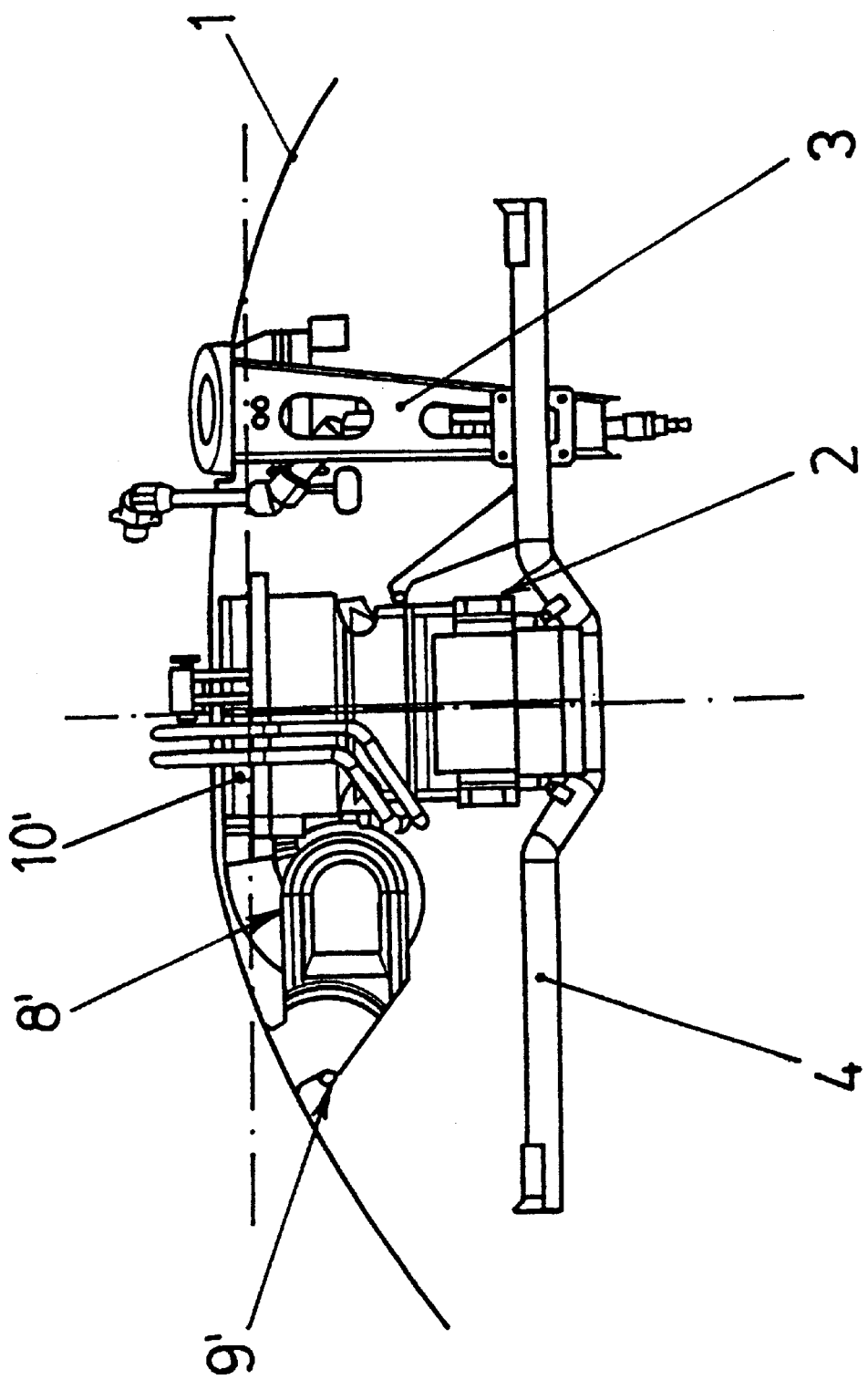
FIG. 2 shows the ventilation box according to the invention from FIG. 1 in the case of a vehicle with a steering column arranged on the right side of the vehicle.

A dashed and dotted line A designates a vertical parting plane, in which the housing parts 5' and 10' have a connecting flange. The diffuser 10' is capable, together with the blower box 8' and the fresh-air/surrounding-air flap 9', of being fastened to the housing part 5' in the position illustrated in FIG. 1 or in a position, as shown in FIG. 2, rotated through 180° about the vehicle longitudinal axis B which intersects the flange surface of the housing parts 5' and 10' centrally and perpendicularly. Here, as below, identical components are given the same reference symbols.

In FIG. 2, the steering column 3 is arranged on the right side of the ventilation box 2 from FIG. 1. The blower box 8' and the fresh-air/surrounding-air flap 9' are arranged on the left side of the vehicle, and the diffuser 10', as before, approximately in the middle of the vehicle, but in a position rotated relative to the housing part 5'.

Figure 3:
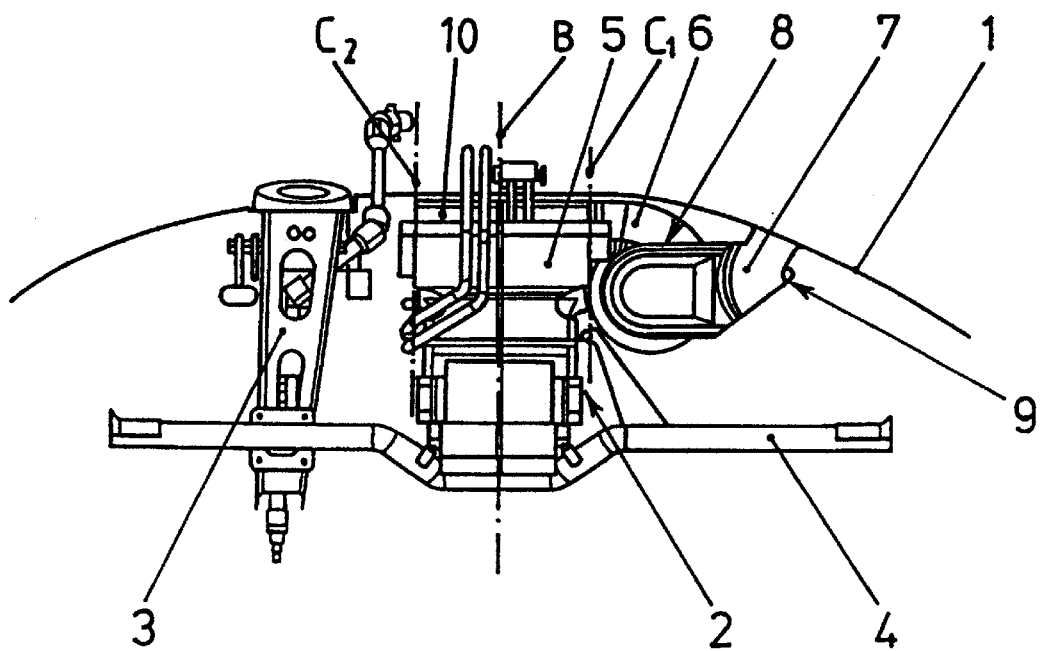
FIG. 3 shows a further ventilation box according to the invention for a motor vehicle with a steering column arranged on the left side of the vehicle.

FIG. 3 shows a top view of a further ventilation box 2 arranged in front of a diagrammatically illustrated end wall 1. A steering column 3 is arranged on the left side next to the ventilation box 2. The ventilation box 2 and the steering column 3 are fastened to a crossmember 4. The ventilation box 2 is composed of a plurality of housing parts 5–7 and 10. Both the largest housing part 5 of the ventilation box 2 and a diffuser 10 are arranged in a front middle region of the motor vehicle. On that side of the largest housing part 5 which is located opposite the steering column 3, the ventilation box 2 has housing parts 6, 7 of a blower box 8 and of a fresh-air/surrounding-air flap 9.

A dashed and dotted line B indicates the vehicle longitudinal axis. $C_1$, and $C_2$ designate parting planes for selectively fastening housing parts on the left or the right side of the motor vehicle, the housing parts having a parting flange in the parting plane.

The parting flange, not connected in each case, of the housing parts arranged in the middle region of the passenger compartment may be closed, for example, by means of a plate or a dummy plug. In FIG. 3, this is the flange arranged in the plane $C_2$.

Figure 4:
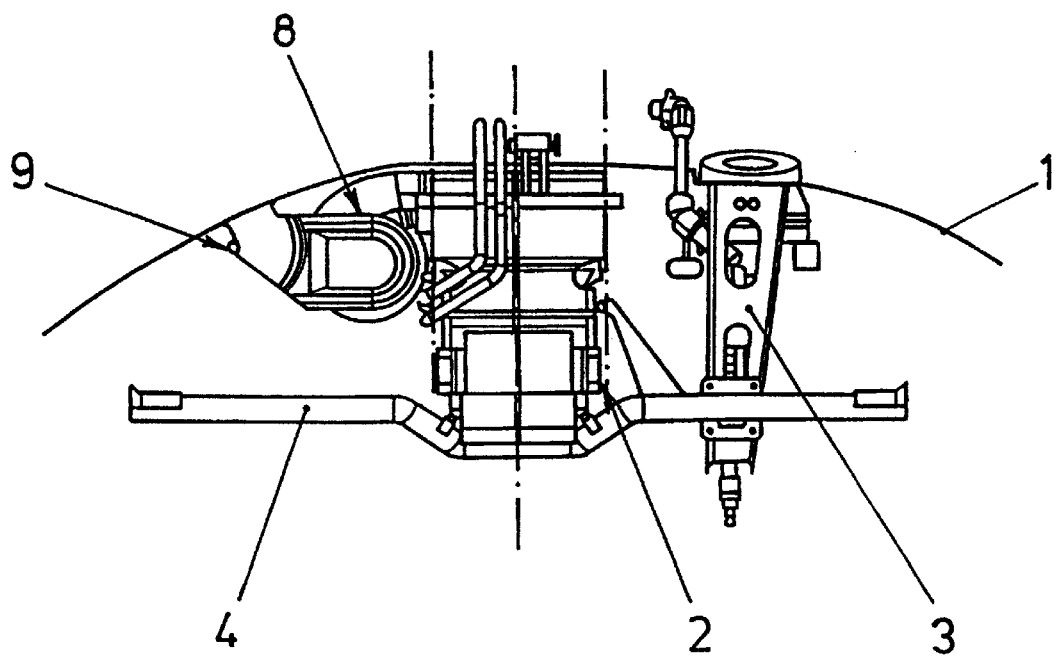
FIG. 4 shows the ventilation box according to the invention from FIG. 3 in the case of a motor vehicle with a steering column arranged on the right side of the vehicle.

In FIG. 4, the steering column 3 is arranged on the right side of the ventilation box 2 from FIG. 3. The housing parts 6, 7 belonging to the blower box 8 and to the fresh-air/ surrounding-air flap 9 are arranged on that side of the largest housing part 5 which is located opposite the steering column 3.

We claim:
1. A ventilation box intended to be arranged in a motor vehicle and having a plurality of housing parts for guidance of fresh air out of surroundings or of surrounding air into a passenger compartment of the vehicle, wherein a first housing part of the plurality of housing parts has a configuration for emplacement approximately in the middle of the vehicle, and wherein a set of further ones of the housing parts have configurations for emplacement opposite a steering column of the motor vehicle with respect to the vehicle longitudinal axis, the respective configurations of the further ones of the housing parts enabling the set of the further ones of the housing parts to be fastened selectively in either a first arrangement of the further housing parts on both right and left sides of the first housing part or in a second arrangement, opposite to the first arrangement, wherein the further housing parts are located respectively on the left and the right sides of the first housing part relative to a direction of travel.

2. The ventilation box as claimed in claim 1, wherein a housing part (7; 7') having intake orifices is formed on adjacent housing parts (6; 6') for selective fastening to the intake orifices in a front or rear region.

3. The ventilation box as claimed in claim 1, wherein the housing parts (6; 10') intended for selective arrangement and the other housing parts (10; 5') each have a flange for their connection.

4. The ventilation box as claimed in claim 3, wherein the flanges and/or continuous edges on the housing parts (6; 10') intended for selective arrangement and provided for engaging over adjacent regions of the other housing parts (10; 5') are arranged approximately perpendicularly to direction of flow.

5. The ventilation box as claimed in claim 3, wherein the flanges and/or continuous edges on the housing parts (6; 10') intended for selective arrangement and provided for engaging over adjacent regions of the other housing parts (10; 5') are arranged approximately vertically with respect to a vehicle floor.

6. The ventilation box as claimed in claim 1, wherein the housing parts (6; 10') intended for selective arrangement have continuous edges provided for engaging over adjacent regions of the other housing parts (10; 5').

7. The ventilation box as claimed in claim 1, wherein the housing parts (6, 7; 6', 7', 10') intended for selective arrangement are rotatable relative to the other housing parts (5, 10; 5').

8. The ventilation box as claimed in claim 1, wherein one of the selectively fastenable housing parts (7; 7') is part of a fresh-air/surrounding-air flap (9; 9').

9. The ventilation box as claimed in claim 1, wherein one of the selectively fastenable housing parts (6; 6') is part of a blower box (8; 8').

10. The ventilation box as claimed in claim 9, wherein said blower box (8; 8') has a blower wheel and a blower motor.

11. The ventilation box as claimed in claim 10, wherein the blower motor is arranged on a topside or underside of the blower box (8; 8') with respect to the vehicle floor.

12. The ventilation box as claimed in claim 10 [or 12], wherein the blower motor is connected releasably to the blower box (8; 8').

13. The ventilation box as claimed in claim 10, wherein the blower box (8; 8') has, on its topside and underside with respect to vehicle floor, junction elements for the blower motor which in each case correspond to one another.

14. The ventilation box as claimed in claim 10, wherein the connection of the blower motor and blower box (8; 8') is a bayonet fastening.

15. The ventilation box as claimed in claim 1, wherein one of the selectively fastenable housing parts (10; 10') is part of a diffuser.

16. A ventilation box intended to be arranged in a motor vehicle and having a plurality of housing parts for guidance of fresh air out of surroundings or surrounding air into a passenger compartment of the vehicle, wherein a first housing part of the plurality of housing parts has a configuration for emplacement approximately in a middle of the vehicle, and wherein a second housing part of the plurality of housing parts has a configuration enabling installation in front of the first housing part in direction of travel, there being a set of further ones of the housing parts having respective configurations enabling emplacement opposite a steering column of the motor vehicle with respect to the vehicle longitudinal axis selectively to the first housing part in two positions, the two positions being rotated through approximately 180° relative to one another about the vehicle longitudinal axis.

17. The ventilation box as claimed in claim 16, wherein a housing part (7; 7') having intake orifices is formed on adjacent housing parts (6; 6') for selective fastening to the intake orifices in a front or rear region.

18. The ventilation box as claimed in claim 16, wherein the housing parts (6; 10') intended for selective arrangement and the other housing parts (10; 5') each have a flange for their connection.

19. The ventilation box as claimed in claim 18, wherein the flanges and/or continuous edges on the housing parts (6; 10') intended for selective arrangement and provided for engaging over adjacent regions of the other housing parts (10; 5') are arranged approximately perpendicularly to direction of flow.

20. The ventilation box as claimed in claim 18, wherein the flanges and/or continuous edges on the housing parts (6; 10') intended for selective arrangement and provided for engaging over adjacent regions of the other housing parts (10; 5') are arranged approximately vertically with respect to a vehicle floor.

21. The ventilation box as claimed in claim 16, wherein the housing parts (6; 10') intended for selective arrangement have continuous edges provided for engaging over adjacent regions of the other housing parts (10; 5').

22. The ventilation box as claimed in claim 16, wherein the housing parts (6, 7; 6', 7', 10') intended for selective arrangement are rotatable relative to the other housing parts (5, 10; 5').

23. The ventilation box as claimed in claim 16, wherein one of the selectively fastenable housing parts (7; 7') is part of a fresh-air/surrounding-air flap (9; 9').

24. The ventilation box as claimed in claim 16, wherein one of the selectively fastenable housing parts (6; 6') is part of a blower box (8; 8').

25. The ventilation box as claimed in claim 24, wherein said blower box (8; 8') has a blower wheel and a blower motor.

26. The ventilation box as claimed in claim 25, wherein the blower motor is arranged on a topside or underside of the blower box (8; 8') with respect to the vehicle floor.

27. The ventilation box as claimed in claim 25, wherein the blower motor is connected releasably to the blower box (8; 8').

28. The ventilation box as claimed in claim 25, wherein the blower box (8; 8') has, on its topside and underside with respect to vehicle floor, junction elements for the blower motor which in each case correspond to one another.

29. The ventilation box as claimed in claim 25, wherein the connection of the blower motor and blower box (8; 8') is a bayonet fastening.

30. The ventilation box as claimed in claim 16, wherein one of the selectively fastenable housing parts (10; 10') is part of a diffuser.

* * * * *